United States Patent Office 3,692,581
Patented Sept. 19, 1972

3,692,581
ACID MODIFICATION OF FLOUR AND STARCH
WITH HCl AND HF
Peter J. Ferrara, Ridge Road, Cornwall, N.Y. 12518
No Drawing. Filed Feb. 23, 1971, Ser. No. 118,181
Int. Cl. C13l 1/08
U.S. Cl. 127—38     7 Claims

ABSTRACT OF THE DISCLOSURE

Improved acid modification of starches and flours by treating such in the conventional manner with a mixture of hydrogen fluoride and at least one other mineral acid.

---

This invention relates to acid-modified starch and flour products. It more particularly refers to an improved method of acid modifying such products.

In U.S. Pat. No. 3,479,220 issued Nov. 18, 1969, "Acid-Modified Starches and Flours and Method of Making the Same," reference is made to known processes which are applied to wet-milled starches or relatively pure forms of cereal flours having various levels of protein as well as other components; namely ash, fibre and fat. The presence of these extraneous components in starchy flours imposes the need for particular processing conditions to achieve commercially useful acid-modified flours.

Thus, in Rankin et al., U.S. Pat. No. 3,073,724, the modification of flours by adding aqueous solutions of mineral acid thereto is accomplished with flours which have been previously dried under mild conditions to a moisture content less than 1.4%. Other inventors, Wimmer et al., U.S. Pat. No. 2,894,859, and Morris, U.S. Pat. No. 2,359,378 resort to a combination of pregelatinization of the flour followed by acid treatment; or to a dextrinization technique following the acidification process.

Close analysis of these practices leads to an appreciation of why flours are sometimes dried before the aqueous mineral acids modifying agents are applied. The apparent intent of the prior art is to prevent the water dilution of the mineral acid which dilution would impair the process and reduce the extent of modification expected to be caused by the applied acid. Another reason is that the flours or starches so pre-dried or pre-gelatinized are more responsive to the influence of the acids used.

In addition, the requirement of very fine atomization of the acid solution, in combination with intensive mixing seeks to avoid the formation of wet agglomerates of starchy flours as these become acid-modified to a greater degree than do other portions of the flour which are free of agglomerates.

In the above-referred to U.S. Pat. No. 3,749,220, many of the disadvantages cited hereinabove are circumvented. The desired objectives, in terms of economic and quality acid-modified products are attained primarily by way of impregnating mineral acid on and into a dry inert carrier of large surface area and pore volume. The acid impregnated carrier retains its unimpregnated characteristic mobility of a fine dry powder so it can be easily blended-in with a starch or flour of normal moisture content. The subsequent transfer of the mineral acid to the starch bearing materials takes place uniformly with full effectiveness, though the acidification takes place slowly. The starch bearing materials treated according to the '220 patent can carry the normal moisture levels such flours or powders have when sold in commerce. This is of course, a matter of economic interest since it eliminates or reduces the need for drying the starches or flours prior to acidifying such.

Those versed in the art and practice of acid-modification techniques seek to impart to the flour or starch particular ranges of reduced viscosity without impairment of srtength and other desirable characteristics. When the preferred degree of acid-modification is realized, for certain applications it may be necessary to arrest the acid-modification process by neutralizing the acid condition created by the mineral acid. This neutralization may be accomplished in a variety of methods as is evidenced by a review of the literature. A review of the neutralization practices in the literature and art, including issued patents, discloses one common understanding; whether the neutralization is achieved by the usage of sodium hydroxide, ammonium hydroxide, calcium hydroxide or other alkali agents, the amount of alkali used close approximates the stoichiometric equivalent of the acid used in the acid-modification step. In fact, the generally accepted range of alkali equivalence is from 90% to 100% on a mol basis of the acid used. Presumably, the lower values in this range could be the choice when there is some loss of acid through escapement of the more volatile acids when applied. The higher values of alkali addition may be required to offset some acidic condition carried by the starch bearing material in its original state.

The fact that one needs in the neutralization step as much alkali as the original acid used in the acid-modification suggests that the acidic ions, in the presence of starch, or the starch component of cereal flours, do not become fixed ions as in the usual reactions involving a metallic cation and an anion.

While the mechanisms of the acid in the course of acid-modification of starches seems difficult to define, the effect of temperature, time and concentration are known by those skilled in this art to have an effect on the extent of modification. It is apparent however, that little, if any of the actual mineral acid applied in the acid-modification enters into a permanent chemical union with the starch bearing component.

Therefore, one object of this invention is to provide a method of preparing suitable acid-modified starches and flours more economically.

It is a further object of this invention to provide a practical method for the uniform distribution of a mineral acid onto a starch or flour in its usual granulation of commerce.

Still another object is to obtain the desired degree of acid-modification of the starch or flour using minimal quantities of mineral acid.

Another object of this invention is to provide acid modified flours capable of forming pastes of desired reduced viscosity and other preferred properties such as lower temperatures of starch gelatinization.

Still another object is to provide acid modified flours having enhanced values of "hydrogen bonding."

Other and additional objects will become apparent from a consideration of this entire specification including the claims hereof.

In accord with and fulfilling these objectives one aspect of this invention resides in the discovery that starch and flour products are readily acid-modified using as the acidifying agent, mixtures of mineral acids and hydrofluoric acid. The ratio of a mineral acid to hydrofluoric acid may be varied over a wide range. The hydrofluoric acid may be used in combination with various known acidifying mineral acids such as sulfuric, hydrochloric and phosphoric acids. It is not clear why the combination of hydrofluoric acid with other mineral acids achieves the unique acid-modification results which have been found.

Hydrofluoric acid, or hydrogen fluoride is commonly known as a weak acid having one unique property that of etching glass. Its disassociation constant places its available hydrogen ion value close to that of acetic acid.

It has a molecular weight of 20 making it the smallest acid unit whether organic or inorganic. Moreover, with the fluorine anion possessing extraordinary electro-negative properties, hydrofluoric acid may be expected to be a noted source of "hydrogen bonds."

Hydrofluoric acid is normally produced commercially by reacting calcium fluoride (fluorospar—a mineral available in Mexico and several states in the United States) with sulfuric acid. It is also possible to generate the HF using hydrochloric acid and fluorospar, though this reaction to produce HF proceeds at a slower rate. When commercial HF of high purity is required, it is preferred to use the sulfuric acid route, and when combinations of HCl and HF are preferred, it is preferred to produce the mixtures by combining the calculated weights of fluorospar and HCl solutions, so the solution thus produced will then contain the 2 mineral acids in the desired ratio. Other fluoride bearing materials may be used as sources of HF, though powdered fluorospar direct from the mines is generally the most economic.

The acid modification of starches or flours described herein is carried out procedurally in the same manner as the prior art. Thus, either direct acid addition to the starch or flour can be used or the procedure of U.S. Pat. 3,479,220 can be used. The hydrogen fluoride should be present in a mol proportion to the other mineral acid or acids being used of about 1.0 to 5.0 and the total acid weight used should be in a ratio of about 0.40% to 1.25% in relation to the weight of the starch or flour being treated. Acid modification according to this invention is carried out at about room temperature but other temperatures between about 10 and 50° C. can be used without consequence.

The following examples and data will serve to illustrate the practice of this invention without being limiting thereon.

Example 1 shows a comparison of a typical sorghum flour (milo) acid-modified using a commercial 22° Baumé HCl and the same flour subjected to an equivalent amount of acid with a portion of the HCl replaced by HF. The relative acid-modification effectiveness of HCl by itself, and the mixture of HCl and HF are shown in the Table 1. These data were derived from experiments carried out in the manner of Example 1.

A rectangular mixing conveyor 12" wide x 60" long and 14" deep constructed of 316 Stainless Steel equipped with twin shafts of 1½" stainless pipe, which serve as twin shafts, drilled to accommodate adjustable pitch V-shaped paddles was used. A total of 78 paddles were installed in such manner that the faces of the paddles cut through material on the conveyor and simultaneously created a pattern of flow whereby the flour being acidulated travels in a circuit route along one shaft and was cycled back along the opposite shaft. Milo flour charged into the conveyor was limited to 100 lbs. per run, the amount which permits thorough cycling of the contents. The cover or the top of the conveyor unit consisted of a 2-piece unit made of polyvinyl chloride plastic sheets, each drilled to accommodate the entry of an atomizing nozzle of the 2-fluid type; a nitrogen gas supply to atomize, and the acidifying solution. The conveyor had a bottom gate which could be opened to discharge the contents.

The milo flour used in Example 1 was of a commercial grade, with the following analysis of the important components:

| | Percent |
|---|---|
| Protein | 5.9 |
| Moisture | 12.8 |
| Mineral ash | 0.73 |
| Fat | 2.7 |

(A) For the acid-modifications 2.61 lbs. or 22° Bé. hydrochloric acid was weighed out and placed in a stoppered polytetrafluoroethylene flask so that it could be fed into the two atomizing nozzles, one at each end of the mixing conveyor. This acid is equal to 0.92 lbs. of contained HCl or 0.92% of the 100 lb. weight of milo flour. This quantity of acid was fed into the milo over a period of 20 minutes. Mixing was then continued for another 20 minutes, and the acid-modified flour was then discharged from the conveyor into a wax-lined, fiberboard drum and which was then covered.

(B) A second batch of acid was prepared by adding 0.50 lbs. of a 98% acid grade of powdered fluorospar to 5.13 lbs. of 22° and Bé. HCl and allowing this to react and settle for 24 hours. The same quantity, 2.61 lbs. of liquid acid was weighed out, care being taken not to disturb the sludge or sedimented solids. This quantity of acid mix is equivalent to 0.61 lbs. of contained HCl and 0.12 lbs. of HF. A part of the reduction in the combined acid weight is due to the formation of the calcium salt, and some due to the formation of the lower mol weight of HF. Nevertheless, for the purposes of showing the HF effect, the amount of this mixed acid is equivalent to the 22° Bé. HCl in part A above. After charging this mixed acid onto 100 pounds of milo flour and mixing for 20 minutes following the acid addition, the acid-modified milo was placed into a fibreboard drum, similar to A above.

When the 2.61 lbs. mixture of HCl and HF was added, as in test B, to 100 lbs. of milo of the same composition as in test A, it is clear as evidenced by Table 1, that the reduction in paste viscosity (used as an index of acid-modification) is greatly favored by the substitution of HF for a part of the HCl.

Samples of the acid-modified milo of Test A and Test B are removed from the fiberboard drum at 24-hour intervals, and checked for viscosity using a C. W. Brabender Visco/Anylograph. These acid-modification tests made with milo flour stored at approximately 80° F. indicate that the presence of HF more than doubles the rate of acid-modification. The mixed acid HCl-HF is also more easily taken up by the flour without forming wet agglomerates as happens with HCl alone.

TABLE 1.—PEAK VISCOSITY OF ACID-MODIFIED MILO FLOUR (PER EXAMPLE 1) IN BRABENDER UNITS. TEST VISCOSITY CONCENTRATION—100 GRAMS OF FLOUR PRODUCT PER 400 ML. OF WATER. FLOURS PROCESSED WITH HCl (TEST A) AND MIXED HCl AND HF (TEST B)

Test A—0.92% HCl based on flour weight (Bakers percentage)
Test B—0.61% HCl and 0.12% HF based on flour weight (Bakers percentage)

| | Viscosity value, B.U. | |
|---|---|---|
| | Test A | Test B |
| Hours from start: | | |
| 24 | 1,860 | 1,580 |
| 48 | 1,425 | 1,110 |
| 72 | 1,105 | 810 |
| 96 | 930 | 590 |
| 120 | 720 | 360 |
| 144 | 605 | 240 |
| 168 | 525 | 125 |
| 192 | 460 | 80 |
| 216 | 420 | 40 |
| 240 | 365 | |
| 264 | 360 | |
| 288 | 345 | |

A comparison of the data tests A and B show that the use of HF in combination with HCl makes it possible to lower the paste viscosity of milo flour to a level approximating 400 B.U. in less than half the time interval than when HCl is used alone.

The following Example 2 shows the effectiveness of the combination of HCl and HF, when used in lower proportions with the same milo flour as in Example 1. Comparison data are shown in tests C and D in Table 2. The accelerated lowering in paste viscosity is clearly evident, when the acid combination including HF is used as compared to HCl alone.

In Test C the HCl in the acid mix was reduced to ⅔rds that used in Test B, and in Test D, this same quantity of HCl was used but the amount of HF was lowered from 0.08% to 0.06%.

TABLE 2.—PEAK VISCOSITY OF ACID-MODIFIED MILO FLOUR IN BRABENDER UNITS—TEST VISCOSITY CONCENTRATION, 100 GRAMS OF FLOUR PRODUCT PER 400 ML. OF WATER. FLOURS PROCESSED WITH MIXED HCl AND HF

Test C—0.406% HCl and 0.08% HF (based on flour)
Test D—0.406% HCl and 0.06% HF (based on flour)

|  | Viscosity value, B.U. | |
| --- | --- | --- |
|  | Test C | Test D |
| Hours from start: |  |  |
| 24 | 1,790 | 2,020 |
| 48 | 1,350 | 1,720 |
| 72 | 1,015 | 1,520 |
| 96 | 900 | 1,360 |
| 120 | 695 | 1,200 |
| 144 | 565 | 1,080 |
| 168 | 475 | 1,020 |
| 192 | 400 | 950 |
| 216 | 380 | 890 |
| 240 | 320 | 820 |
| 264 | 305 | 820 |
| 288 | 295 |  |

It is apparent from the data shown in Tables 1 and 2 that with a substantial reduction in the quantity of HCl used, and even a smaller quantity of HF, the acid mix is still effective to cause acid-modification at a markedly superior rate.

In Example 3, the effect of HF as an acid-modifying agent without HCl is shown to be positive yet relatively inferior. The data are listed in Table 3.

TABLE 3

Peak viscosity of milo flour in brabender units—when acid modification is carried out with 0.90% HF used alone as the source of acid per 100 lbs. of milo. brabender test for viscosity—100 grams acid modified product per 400 ml. water.

Hours from start: Viscosity value—B.U. Test E
24 ---- 2425
48 ---- 2080
72 ---- 1830
96 ---- 1635
120 ---- 1450
144 ---- 1340
168 ---- 1260
192 ---- 1160
216 ---- 1110
240 ---- 1130
264 ---- 1130
288 ---- 1110

To facilitate a reading of acid modification value using HF alone, the same milo flour used in the prior examples was treated with HF. A commercial grade of 30% HF is used and applied to the milo just as described in the mixing procedure of Example 1. One lot of 100 lbs. of milo was charged into the mixer and 3.0%, or 0.90% by weight of contained HF added to the milo. This amount closely approximated the amount of HCl used in Test A of the first example. While the color of the milo became noticeably lighter, after 72 hours, indicating a reaction with HF was taking place, the viscosity measurements reveal a substantial reduction in the rate of acid-modification of the starch fraction.

This test using HF alone reveals that without benefit of an acid condition with a corresponding low pH, the effectiveness of HF as an acid modifying material is not much greater than that obtainable from the use of a weak organic acid, such as formic acid. The effect of HF in the presence of a stronger mineral acid therefore appears to be synergistic.

Certain observations made with cooked starch or flour pastes of acid modified materials derived from mineral acid mixtures with HF used at levels above 0.06%, suggest some unusual effects which may be ascribed to a property like "hydrogen bonding" from the HF portion. Thus, when acid modified materials derived through the inclusion of HF as a part of the acid mixtures, are cooked into pastes or slurries, the cooked pastes remain as fluid pastes for periods of up to 10 days or more, and then gradually begin to thicken and form a gel. Without the HF, the thin pastes or slurries will either retain the viscosity from the beginning without change or assume a gel state within a matter of serveral hours after cooking and cooling. Thus the delayed formation of a gel is a peculiarity which appears to be related to an effect of the presence of HF. While not wishing to be bound by any particular theory, it may be that the disaggregated starch molecules under the influence of HF tends to form units having linear shapes, and these stretched out units may assume parallel positions, at least initially then gradually the linear units begin to re-combine forming longer chain lengths capable of gelling.

Another peculiarity which appears to be attributable to some effect of HF is the almost complete absence of reducing sugars when starches or cereal flours are acid modified with combinations of mineral acids and HF. It seems as if the HF enables a more selective de-branching or disaggregation of the glucoside units making up the starch molecule.

Di-methyl sulfoxide (DMSO) is known to have unique solvent properties. 7 ml. of DMSO will take into solution 3.0 grams of pure amylopectin, the branched chain component of normal starches. On the other hand, adding 3.0 grams of pure amylose, the straight chain molecule inherent in a normal starch, to 7 ml. of DMSO produces a far different effect. The amylose merely absorbs the DMSO, swelling up to resemble a crepe rubbery gel. When starches and cereal flours which have been acid modified with mixed HF containing mineral acids are tested by admixing such with DMSO, the results appear to suggest the solubility of amylopectin but with the formation of DMSO-starch solution of higher than expected viscosity. While the reasons for the more viscous DMSO-starch solution is not known, it may be that the starches acid modified with HF have solubility in DMSO because of their smaller average molecular weights. The straight chain or linearity of the small amylose units could make this material more soluble in DMSO but with a slight increase in the viscosity of the solution.

While the tests described herein in detail have been carried out with a commercial (milo) flour, parallel acid modification studies made with several grades of corn flour showed equivalent results. Milo was chosen for intensive study as a source of definitive data, because it is known that milo flours respond difficultly to acid modification processes of the type described herein. Milo (sorghum) on milling tends to form flour granules which though small, are hard and vitreous, and thus offer resistance to modification by acid processes. Milo may have (as reported in literature) a composition, in terms of amylopectin and amylose, very much like that of corn but the softer corn flours take up acids far more readily. Thus, processes for the acid treatment of milo can be expected to show smaller variations for small changes in the composition and amount of the acids used.

Corn flours may usually be acid modified with only 70% of the amount of the acid mixture of this invention as compared to the quantity used with milo, and the viscosity changes compare very closely with the changes reported in Table 1, Test B. This accelerated modification with smaller quantities of acid may be due to a lower degree of inhibitory effects exhibited by the components of corn (ash, fibre etc.) as well as to some surface phenomenon.

Acid modifications using mixtures of HCl and HF applied to tapioca appear to take place even more readily than with corn flours or purified corn starches. Winter wheat flours having up to 11% protein and 1.05% ash respond to the acid modification described herein very similarly to the data reported for milo.

The evidence of the synergistic effect of HF in the presence of sulfuric acid are of equivalent importance. Sulfuric acid may not be as effective as HCl when spray or atomization techniques are employed and therefore mixed HF and $H_2SO_4$ are similarly less effective.

Phosphoric acid is not a strong enough acid to generate HF from fluorospar, at least in a reasonable time, therefore, in practice the use of phosphoric acid would dictate the use of previously prepared HF, rather than in situ generated HF. While this might add to the expense of using phosphoric acid this is a technically sound material. In Example 4, this test an 85% grade of phosphoric acid was diluted to 30% and mixed with enough HF, also of a 30% grade, to achieve a 5 to 1 mole ratio of phosphoric acid to HF. This mixed acid was applied at the rate of 2 lbs. per 100 lbs. of milo flour. The acid modification of the milo resembled closely, the pattern evidenced in Table 2, Test D, showing that phosphoric acid is less than 50% as effective as HCl.

As noted above, the prior art has recognized the need of alkali units to neutralize or stop the reaction. In many commercial applications, the neutralization is achieved by the use of ammonium hydroxide and/or sodium hydroxide. It has now been found, and this is another aspect of this invention, that low cost grades of magnesium oxide are obtainable in very fine granulations, 325 mesh and even 400 mesh. These grades of magnesium oxide are free flowing, soft powders, do not cake, and are very easy to handle. One lb. of magnesium oxide has a neutralizing equivalent of almost 2 lbs. of HCl. In many commercial applications of acid modified starches or cereal flours, it would be desirable to use a correspondingly smaller amount of magnesium oxide to achieve neutralization than ammonia and sodium hydroxide.

What is claimed is:

1. In the process of modifying starches or flours by the admixture thereof with mineral acid for a time sufficient to decrease the paste viscosity thereof to a predetermined value; the improvement, whereby the time required to decrease the paste viscosity to the predetermined value is shortened, which comprises using hydrogen fluoride in admixture with said mineral acid.

2. The process of claim 1 wherein said mineral acid is a member selected from the group consisting of hydrochloric, sulfuric and phosphoric.

3. The process of claim 1 wherein the mol ratio of mineral acid to hydrogen fluoride is 2 to 5 to one.

4. The process of claim 1 carried out at about 10 to 50° C.

5. The process of claim 1 wherein the weight ratio of flour or starch to total acid is 80 to 250 to one.

6. The process of claim 1 including stopping the acid modification process by neutralizing said acid.

7. The process of claim 6 including neutralizing with fine grained magnesium oxide.

References Cited

UNITED STATES PATENTS

| | | | |
|---|---|---|---|
| 3,073,724 | 1/1963 | Rankin | 127—70 X |
| 3,175,928 | 3/1965 | Lancaster | 127—38 |
| 3,317,346 | 2/1967 | Kibbel | 127—38 X |
| 3,479,220 | 11/1969 | Ferrara | 127—38 |

MORRIS O. WOLK, Primary Examiner

S. MARANTZ, Assistant Examiner

U.S. Cl. X.R.

127—70